May 30, 1950  J. SINKO  2,509,319
STEERING WHEEL TURNING DEVICE
Filed Feb. 21, 1949
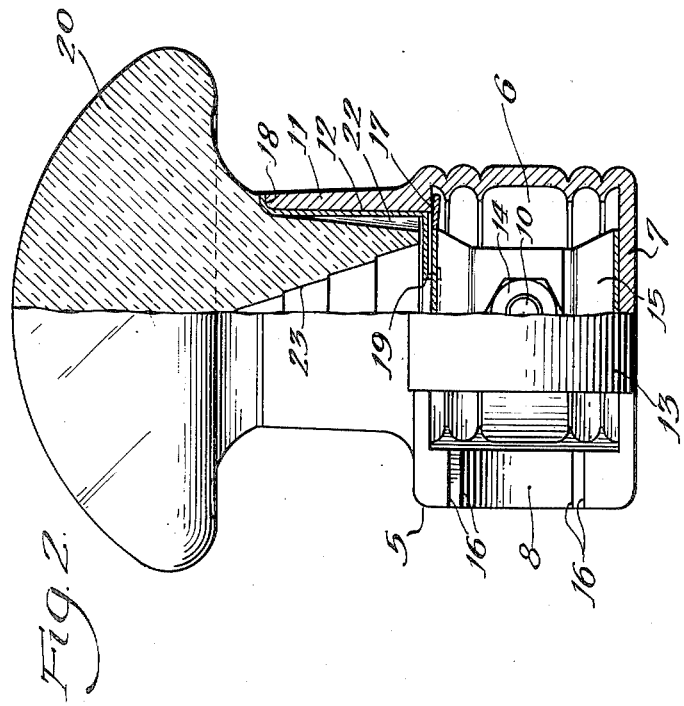
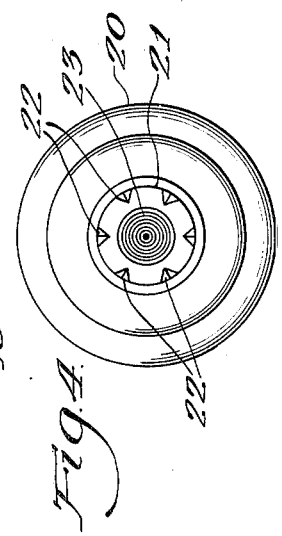
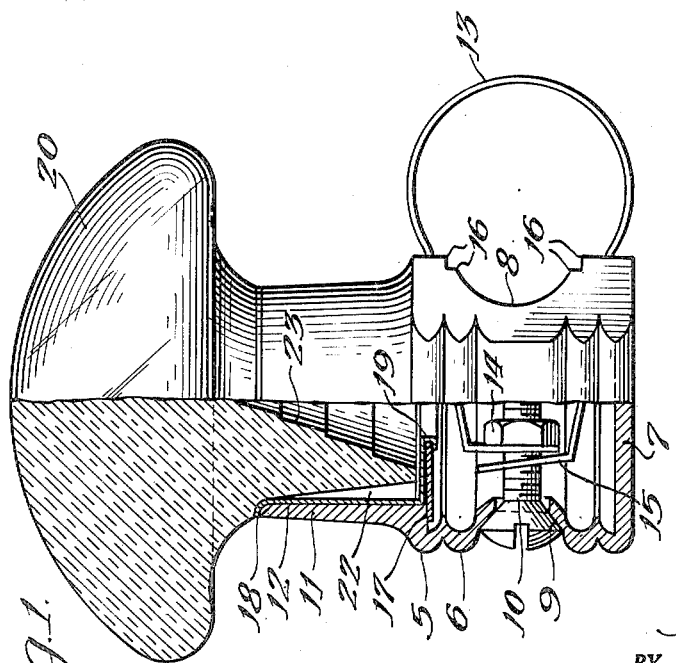
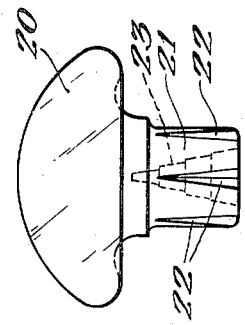
INVENTOR.
John Sinko
BY
Schroeder, Merriam, Hofgren & Brady
Attorneys Patented May 30, 1950

2,509,319

UNITED STATES PATENT OFFICE 2,509,319

STEERING WHEEL TURNING DEVICE

John Sinko, Chicago, Ill.

Application February 21, 1949, Serial No. 77,524

5 Claims. (Cl. 74—557)

This invention relates to a steering wheel turning device, and more particularly to an improved mounting for securing the handle or knob to the body member which is attached to the rim of a wheel.

The primary object of the invention is to provide a compact and strong assembly wherein a greatly improved appearance may be obtained by avoiding the use of an opaque post extending into the knob, and permitting the use of transparent or translucent plastic material in the knob which will give different decorative effects when viewed from various angles.

The invention is illustrated in a preferred embodiment in the accompanying drawing, in which—

Fig. 1 is an elevational view partly in section showing how the clamping band may encircle the rim of a steering wheel; Fig. 2 is a similar view, partly in section, from the inside, taken as indicated at line 2—2 of Fig. 1; Fig. 3 is an elevational view of the handle or knob; and Fig. 4 is a bottom plan view, taken as indicated at line 4—4 of Fig. 3.

In the embodiment illustrated, a metal body member 5 has a hollow base portion 6 which may be closed at the bottom, as indicated at 7. It has a lateral opening on one side, as indicated at 8, for the clamping member, and a countersunk opening 9 at the opposite side for adjusting screw 10. The body member also has a circular crown portion 11 to receive a bushing 12.

The clamping member includes a flexible metal band 13, having its end portions turned inwardly and perforated to receive the screw 10. A nut 14 preferably is welded to the inner side of the shorter end of the band 13. To secure the device to the rim of a steering wheel, the screw 10 is removed and the band 13 bent around the rim with its inner end 15 projecting into the base portion of the body member, and then the shorter end provided with the nut 14 is also thrust into the body member. The screw 10 is then threaded into the nut 14, and it is drawn up tightly so that the sharpened corners 16 of the base member bite into the wheel and hold the device firmly in position.

The upper end of the opening in the base portion is somewhat larger in diameter than the bore in the crown 11, so that a deformed resilient steel washer 17 cannot pass therethrough. The bushing 12 has its top portion flared outwardly, as indicated at 18, and the central portion of its base extends down through the center of the washer and is crimped outwardly under the washer, as indicated at 19, so as to provide a permanent assembly and yieldingly restrain their rotation with respect to the body member 5.

The handle or knob 20 preferably is made of transparent or translucent plastic material, and has a shank portion 21 adapted to fit snugly into the bushing 12. A series of downwardly and inwardly extending angular grooves 22 are provided in the shank portion, and when filled with cement not only help to secure the handle to the bushing, but improve the appearance of the knob. The knob has a centrally disposed upwardly extending stepped bore 29, which preferably is coated with a colored dye. It is found that various tints and colors are visible through the knob, and vary depending upon the angle at which the knob is viewed, producing a very pleasing and decorative effect.

The foregoing detailed description is given for clearness of understanding only, and no unnecessary limitations should be understood therefrom, for some modifications will be obvious to those skilled in the art.

I claim:

1. A steering wheel turning device comprising: a hollow metal body member having a base portion and a circular crown portion, a clamping member secured to said base portion, said clamping member including a screw for adjustably securing the base portion to the rim of a steering wheel, a washer in said base portion, a metal bushing journalled in said crown portion and having its base portion secured to said washer to hold it in the body member, and a handle secured into said bushing.

2. A device as specified in claim 1, in which the bushing extends outwardly over the top of the crown portion of the body member and the washer is resilient and of larger diameter than the opening in which said bushing is journalled whereby the knob is yieldingly restrained from rotation with respect to the body member.

3. A device as specified in claim 1, in which the handle has a shank portion provided with downwardly and inwardly extending angular grooves filled with cement for securing the handle to the bushing.

4. A device as specified in claim 1, in which the handle has a shank portion provided with downwardly and inwardly extending angular grooves filled with cement for securing the handle to the bushing, and said handle is of translucent material and has centrally disposed upwardly extending stepped tapered counterbores.

5. A device as specified in claim 1, in which the bushing extends outwardly over the top of the crown portion of the body member and the washer is resilient and of larger diameter than the opening in which said bushing is journalled, the bushing having a downwardly extending central portion which extends through the center of said washer and is crimped outwardly and under the washer.

JOHN SINKO.

No references cited.